United States Patent [19]

Vaughan

[11] Patent Number: 5,010,689
[45] Date of Patent: Apr. 30, 1991

[54] GLASS RUN CHANNEL

[75] Inventor: Robert A. Vaughan, Dearborn, Mich.

[73] Assignee: The Standard Products Company, Cleveland, Ohio

[21] Appl. No.: 495,783

[22] Filed: Mar. 19, 1990

[51] Int. Cl.$^5$ ............................................. E05D 15/16
[52] U.S. Cl. ..................................... 49/440; 49/489; 49/490; 49/495
[58] Field of Search ................ 49/440, 441, 484, 485, 49/489, 490, 491, 495

[56] References Cited

U.S. PATENT DOCUMENTS

| | | | |
|---|---|---|---|
| 1,498,201 | 6/1924 | Reeves et al. | |
| 1,688,371 | 10/1928 | Bailey. | |
| 2,169,503 | 8/1939 | Schlegel | 20/69 |
| 2,169,504 | 8/1939 | Schlegel | 296/44.5 |
| 2,172,091 | 9/1939 | Scott | 20/69 |
| 2,941,838 | 6/1960 | Wernig | 296/44 |
| 3,420,002 | 1/1969 | Kondolf | 49/440 |
| 3,763,595 | 10/1973 | Sudyk | 49/485 |
| 3,918,206 | 11/1975 | Dochnahl | 49/441 |
| 3,981,118 | 9/1976 | Johnson et al. | 49/441 X |
| 4,015,398 | 4/1977 | Bright | 52/716 |
| 4,030,245 | 6/1977 | Yeomans | 49/490 |
| 4,119,325 | 10/1978 | Oakley et al. | 49/490 X |
| 4,314,872 | 2/1982 | Schiesser | 49/441 X |
| 4,370,833 | 2/1983 | Niemanns | 49/489 |
| 4,478,003 | 10/1984 | Flett | 49/485 X |
| 4,586,552 | 5/1986 | Labelle | 49/485 X |
| 4,608,779 | 9/1986 | Maeda et al. | 49/374 |
| 4,614,061 | 9/1986 | Brocke | 49/440 |
| 4,648,207 | 3/1987 | Shibasaki | 49/441 |
| 4,649,669 | 3/1987 | Okamoto et al. | 49/489 |
| 4,800,681 | 1/1989 | Skillen et al. | 49/440 |
| 4,819,381 | 4/1989 | Kitaura et al. | 49/493 |
| 4,823,511 | 4/1989 | Herliczek et al. | 49/440 X |
| 4,843,763 | 7/1989 | Mesnel | 49/440 |

FOREIGN PATENT DOCUMENTS

| | | | |
|---|---|---|---|
| 1062558 | 7/1959 | Fed. Rep. of Germany | 49/489 |
| 0110323 | 6/1983 | Japan | 49/440 |
| 2085513A | 4/1982 | United Kingdom. | |

Primary Examiner—Rodney M. Lindsey
Assistant Examiner—Jerry Redman
Attorney, Agent, or Firm—Harness, Dickey & Pierce

[57] ABSTRACT

A glass run channel weather strip has a frame member and sealing member. The frame member has an overall S-shape in cross-section with a mechanism to retain the frame onto a flange. Also, the S-shape member includes a mechanism to mechanically retain the seal member within the frame member to form an integral glass run channel.

10 Claims, 4 Drawing Sheets

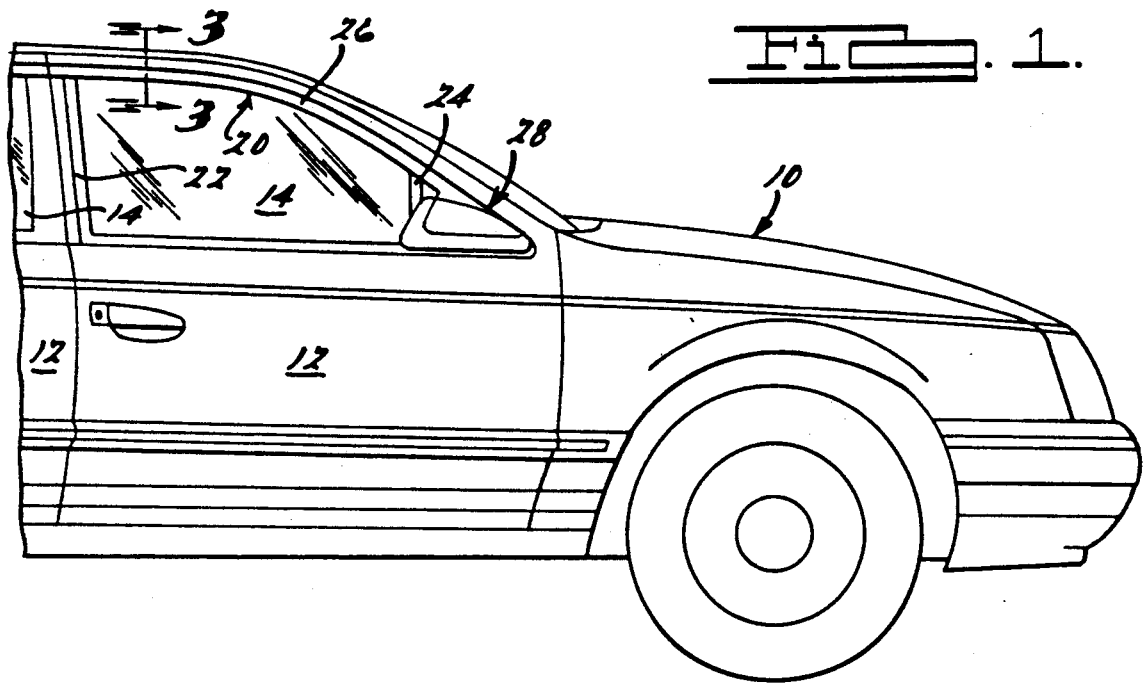
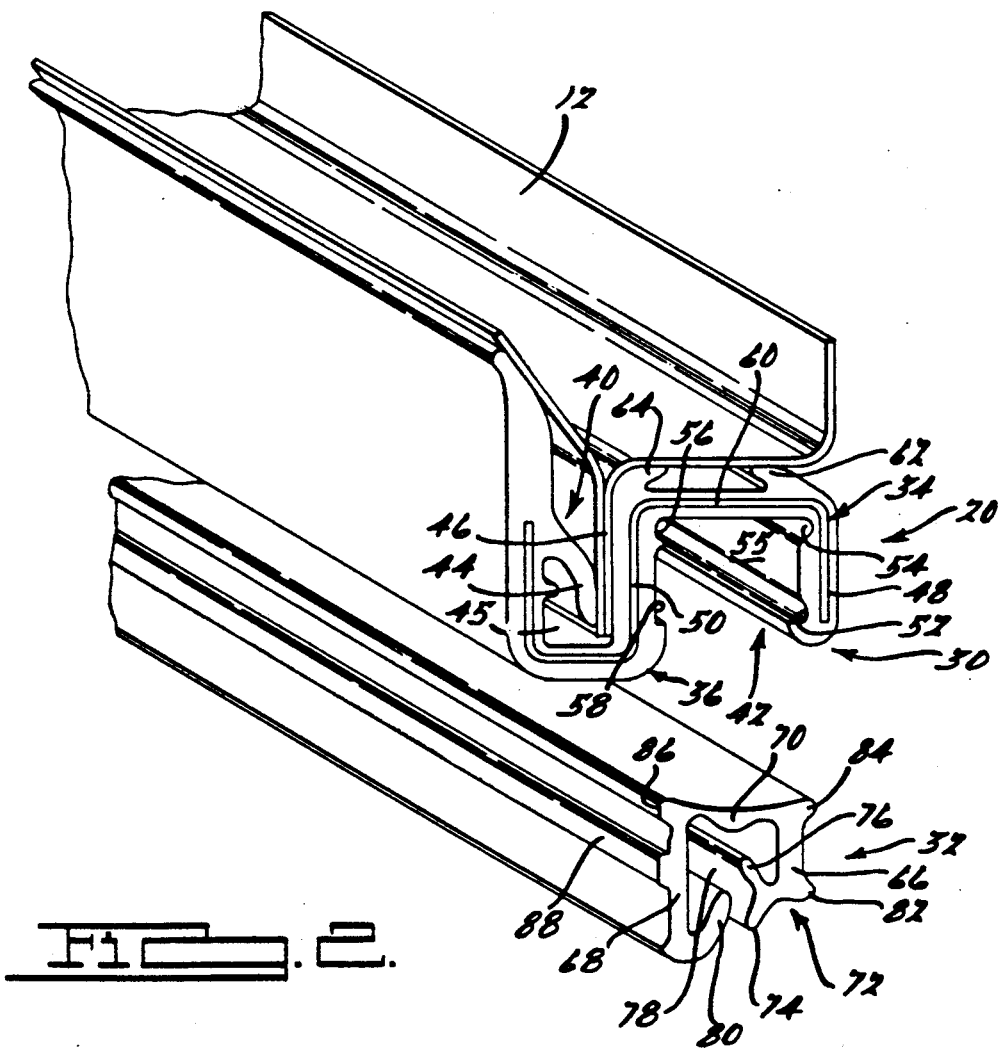

GLASS RUN CHANNEL

BACKGROUND AND SUMMARY OF THE INVENTION

The present invention relates to vehicle weather stripping and, more particularly, to a two piece glass run channel. One member of the glass run channel is adapted to secure to a flange on a vehicle and the other member of the glass run channel is adapted to be received in the first member to receive and seal a window.

Glass run channels are provided on motor vehicles for guiding and holding the window along its travel during its up and down motion. Several types of glass run channels exist in the art to provide this purpose. It is desirable to have a glass run channel member which is securable onto a single pinchweld flange of a stamped door construction. It is also desirable to have an elastomeric channel within the glass run channel to receive and seal the window.

While glass run channels exist in the field, designers are striving to improve the art. Thus, it is an object of the present invention to provide the art with a new and improved glass run channel. The present invention provides the art with a two-piece glass run channel. The glass run channel includes a frame adapted to be secured to a pinchweld flange of a stamped door construction. An elastomeric channel is adapted to be received within the frame to provide a channel to receive and seal the vehicle window.

From the below detailed description taken in conjunction with the accompanying drawings and appended claims, other objects and advantages of the present invention will become apparent to those skilled in the art.

BRIEF DESCRIPTION OF THE DRAWINGS

FIG. 1 illustrates a side elevation view of a vehicle including a glass run channel weather strip in accordance with the present invention.

FIG. 2 is a perspective exploded enlarged view of the glass run channel weather strip of FIG. 1.

DETAILED DESCRIPTION OF THE PREFERRED EMBODIMENT

Figure 3:
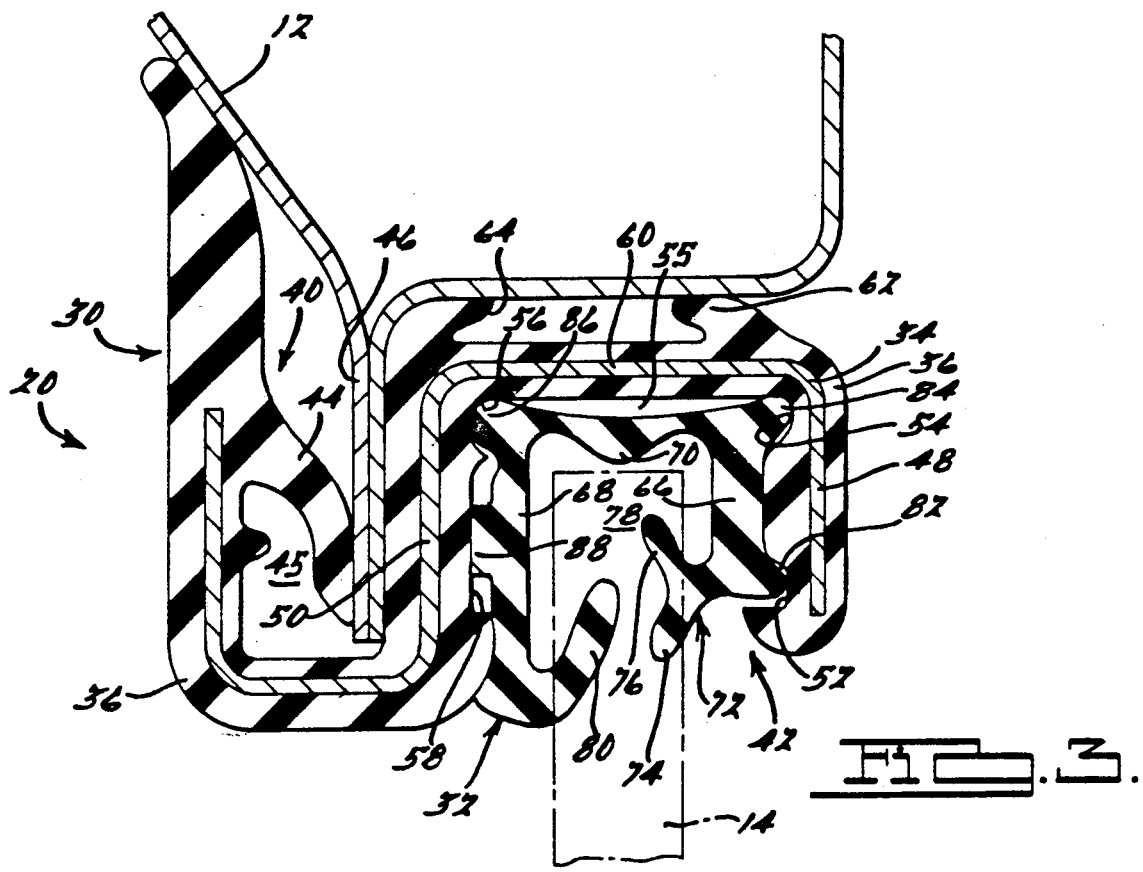
FIG. 3 is a cross-section view of FIG. 1 along a plane defined line, 3—3 thereof.

Turning to the Figures, particularly FIG. 1, a vehicle is illustrated including the glass run channel weather strip of the present invention. The vehicle is designated with the reference numeral 10 and the glass run channel weather strip with the reference numeral 20. The vehicle 10 generally includes doors 12 having windows 14 held and guided in the glass run channel weather strip 20.

Generally the glass run channel weather strip 20 includes a pair of elongated side members 22, 24 and a header member 26. The side members 22 and 24 and header 26 may be of a unitary construction or individual components integrally formed together. Optionally, a vent or mirror plate section 28 may be included. The side members 22, 24 and header 26 may be formed from the same or different type of strips having the same or different cross-sections as desired to form the glass run channel weather strip 20.

The glass run channel weather strip 20 includes a first frame member 30 and a second seal member 32 as seen in FIG. 2. The frame member 30 includes a reinforcement member 34 with an integral skin 36. Generally, the frame member 30 has an overall S-shape in cross-section as can be seen in FIGS. 2 and 3.

The frame member 30 includes a first U-shaped portion 40 and second U-shaped portion 42 which are inverted with respect to one another to form the overall S-shape frame member 30. The first U-shape portion 40 includes a retaining finger 44 to retain the frame member 30 onto the pinchweld flange 46 of the door 12. The retaining member 44 is integrally formed with the skin 36 and projects inward into the interior of the channel 45 formed by the U-shaped portion 40. Several different types of finger arrangements may be used to provide a retaining mechanism to secure the frame member 30 onto the pinchweld flange 46.

The second U-shaped portion 42 includes the integral skin 36 on the interior and exterior of the reinforcement member 34 as can be seen in FIGS. 2 and 3. The skin 36, on the interior surface of the legs 48 and 50, includes channels 52, 54, 56 and 58. The channels 52, 54, 56 and 58 have a desired shape and run the longitudinal length of the elongated reinforcement member 34. The channels 52, 54, 56 and 58 are adapted to receive the sealing member 32. Generally, the one or more channels 52, 54, 56 and 58 may be utilized on the legs 48 and 50 and also on the web 60 to retain the sealing member 32 within the channel 55 defined by U-shaped portion 42. The frame member 30 also includes sealing member 62 and 64 to abut the vehicle door 12 to seal the frame member 30 against the contour of the door 12.

The sealing member 32 is an elongated member having an overall U-shape in cross-section. The sealing member 32 is generally formed from an elastomeric material such as rubber. The U-shaped sealing member 32 is defined by a pair of legs 66 and 68 joined by a web 70. The leg 66 extends a height away from the web 70 a distance less than leg 68. The leg 66 has a projecting hand 72 with a pair of fingers 74 and 76. The fingers 74 and 76 are adapted to position against the window 14 to receive and seal the window 14 within the channel 78 defined by the interior surface of the legs 66 and 68 and web 70. A finger 80 projects from the leg 68 into the channel 78 and is also utilized to seal the window 14 as can be seen in FIG. 3. The exterior surface of leg 66 includes a pair of protruding members 82 and 84. The protruding members 82 and 84 have a shape complementary to the channels 52 and 54 to mechanically secure the sealing member 32 within the channels 52 and 54 of the frame member 30. Leg 68 also includes a pair of protruding members 86 and 88 projecting into channels 56 and 58 to mechanically secure the sealing member 32 in the frame 30. Additionally, the members 86 and 88 may be complementary with the channels 56 and 58.

Moving to FIGS. 4–7, additional embodiments of the present invention are illustrated. Elements which are the same will be designated with the same reference numeral.

Figure 4:
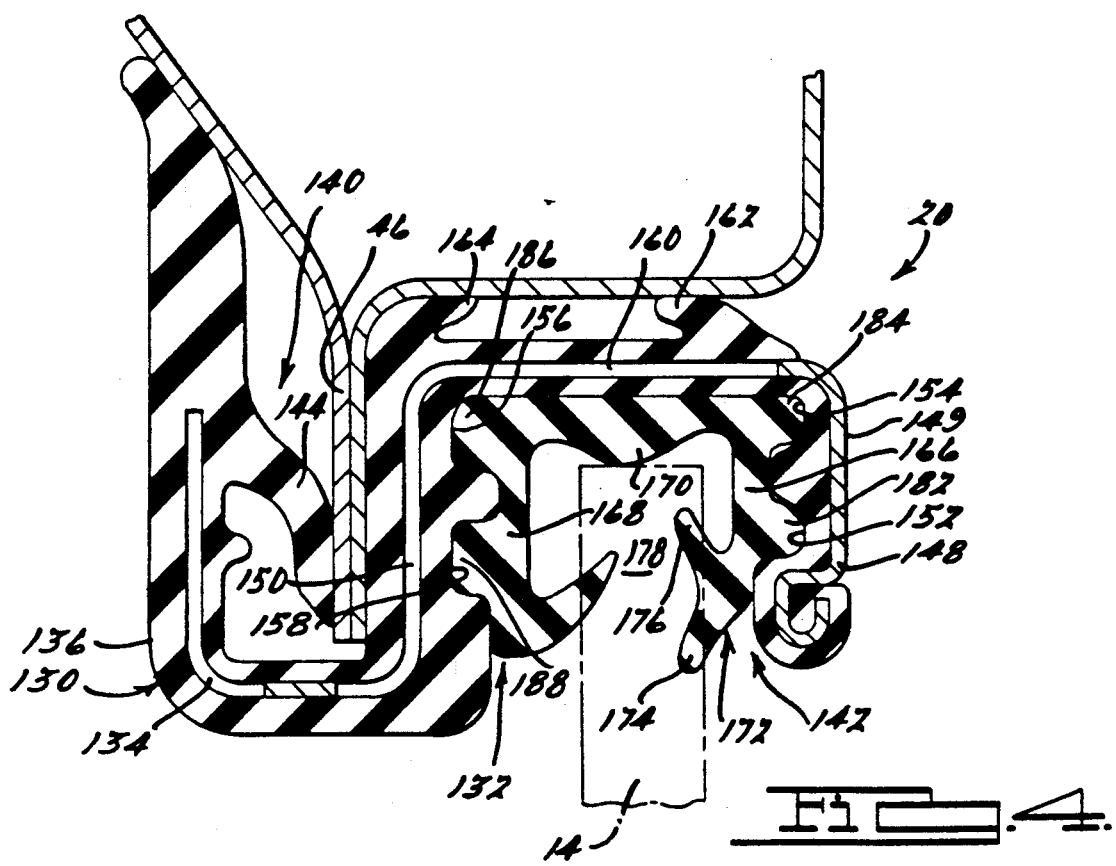
FIG. 4 illustrates a cross-section view of another embodiment of glass run channel weather strip of the present invention.

Referring to FIG. 4, a frame member 130 and sealing member 132 are shown. The frame member 130 includes a reinforcement member 134 and integral skin 136. The frame 130 has an overall S-shape in cross-section with U-shaped portion 140 and 142 inverted with respect to one another to form the S-shaped frame member 130. U-shaped portion 140 is substantially similar to that previously described having a retaining finger 144 securing the frame member 130 to flange 46.

The U-shaped portion 142 includes legs 148 and 150. Leg 148 has an outer exposed surface 149 to provide the vehicle with a pleasing aesthetic appearance. The free end of the leg 148 is curled and is covered with the skin 136. The skin 136 covers the interior of the channel of the U-shaped portion 142 and also the exterior of the web 160 and leg 150. The skin 136 in the channel of the U-shaped portion 142 includes channels 152, 154, 156 and 158. The channels 152, 154, 156 and 158 are adapted to receive the sealing member 132 to mechanically hold the sealing member within the channels 152, 154, 156 and 158. Also, sealing members 162 and 164 extend from the web 160 to seal the frame 130 against the contour of the vehicle door 12.

The sealing member 132 has an overall U-shape in cross-section including legs 166 and 168 joined by web 170. The legs 166 and 168 extend substantially the same height from the web 170. Leg 166 includes a hand member 172 with fingers 174 and 176, which are adapted to guide and seal the window 14. Leg 168 includes finger 180 which, along with finger 176, extends into the channel 178 defined by the legs 166 and 168 and web 170. The exterior surface of leg member 166 includes protruding members 182 and 184 having a shape complementary to the channels 152 and 154 to couple with the channels 152 and 154 to mechanically secure the seal member 132 within the frame 130. Leg 168 also includes protruding members 186 and 188 having a shape complementary to the channels 156 and 158 to mechanically secure the seal member 132 within the frame 130.

Figure 5:
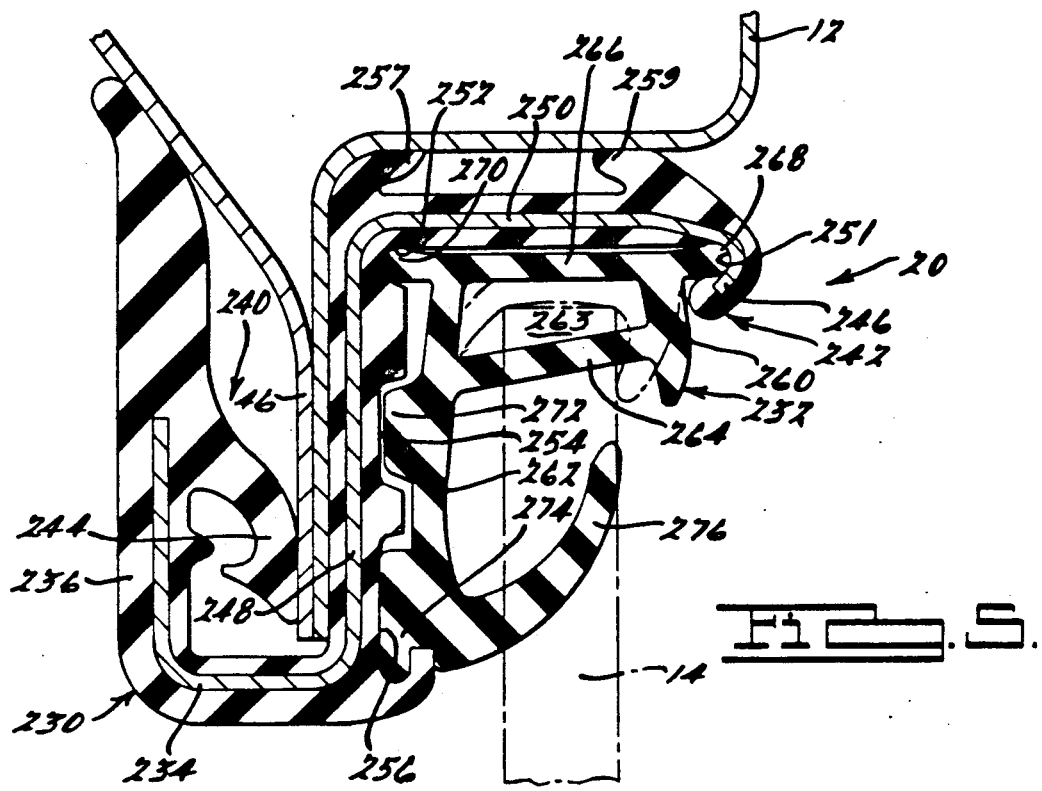
FIG. 5 illustrates a cross-section view of another embodiment of the glass run channel weather strip of the present invention.

FIG. 5 illustrates another embodiment of the present invention. A frame member 230 and seal member 232 are shown. The frame member 230 includes a reinforcement member 234 and integral skin 236 surrounding the entire reinforcement member 234. The frame member 230 has an overall S-shape in cross-section formed by two U-shaped portions 240 and 242 inverted with respect to one another. The U-shaped portion 240 includes a retaining member 244 to secure the frame member 230 onto the flange 46.

The second U-shaped portion 242 has leg 246 with a height substantially shorter than leg 248 extending from web 250. The skin 236 on the interior of leg 246 has a channel 251. Also, the skin 236 on the interior of leg 248 includes a plurality of channels 252, 254 and 256. The channels may have any desired shape as can be seen in FIG. 5. Sealing members 257 and 259 extend from the web 250 to seal the frame 230 against the contour of the vehicle door 12.

The seal member 232 has an overall U-shape in cross-section with a leg 260 having a height substantially shorter than leg 262 extending from web 266. A pair of webs 264 and 266 join the legs 260 and 262. A hollow channel 263 is formed between the two webs 264 and 266 and the legs 260 and 262. A protruding member 268 extends from leg 260 into channel 251 to mechanically retain the seal member 232 within the frame 230. Also protruding members 270, 272 and 274 extend from the exterior surface of leg member 262 to couple with channels 252, 254 and 256 to mechanically retain the seal 232 within the frame 230. The protruding members 270, 272 and 274 have shapes complementary with the channels 252, 254 and 256. A finger 276 extends from leg 262 to seal the window 14 with leg 262. Also, as the window 14 contacts web 266, the free end of leg 260 will move inwardly to seal the window 14 as seen in phantom in FIG. 5.

Figure 6:
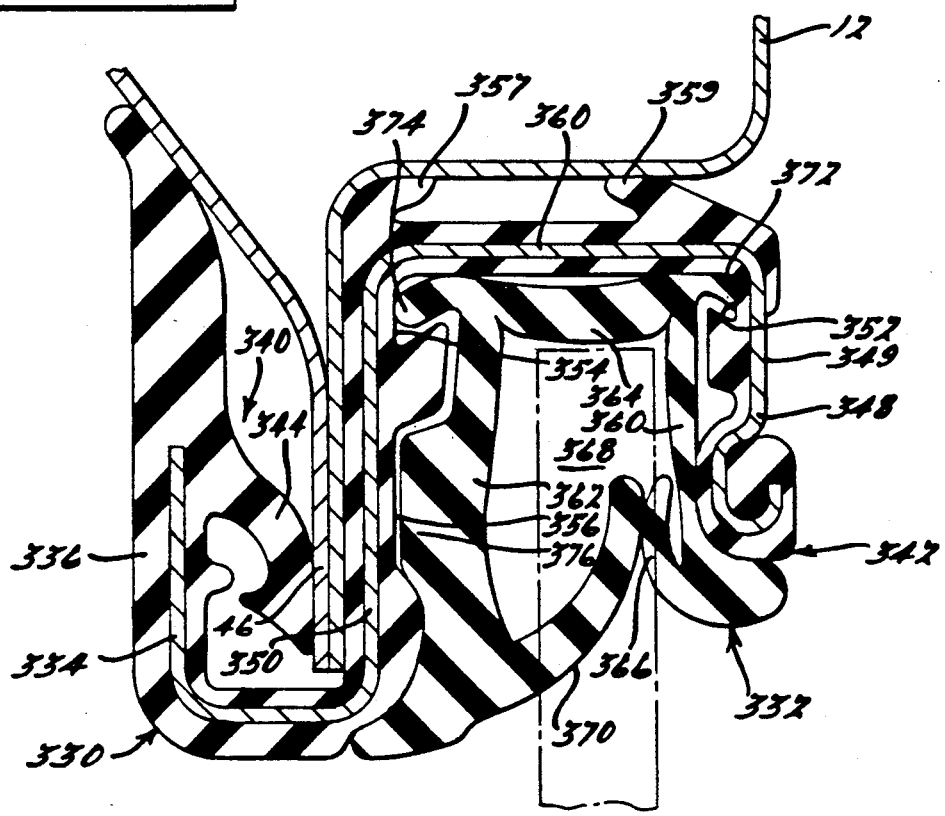
FIG. 6 illustrates a cross-section view of another embodiment of the glass run channel weather strip of the present invention.

Moving to FIG. 6, another embodiment of the present invention is shown. A frame 330 and sealing member 332 are illustrated secured on a flange 46. Frame 330 includes reinforcement member 334 substantially covered by integral skin 336. The frame member 330 has an overall S-shape in cross-section formed by two U-shape portions 340 and 342 inverted with respect to one another. The U-shaped portion 340 includes a retaining finger 344 to retain the frame 330 onto the flange 46.

The U-shaped portion 342 includes legs 348 and 350. Leg 348 has an exposed exterior surface 349 to provide an aesthetic appearance to the strip. Leg 348 also includes a curled free extending end covered by skin 336. The skin 336 covers the interior of the U-shaped portion 342. Channel 352 is formed in the skin 336 along the interior surface of leg 348. Also, channels 354 and 356 are formed on the interior surface of leg 350. All of the channels are adapted to receive the sealing member 332 to mechanically retain the sealing member 332 within the frame 330. Sealing members 357 and 359 extend from the web 360 to seal the frame 330 against the contour of the vehicle door 12.

The sealing member 332 is elongated and has an overall U-shape in cross-section. The U-shape is formed by legs 360 and 362 joined by web 364. Leg 360 extends a height away from web 364 less than that of leg 362. Leg 360 includes a sealing member 366 extending into channel 368 of the U-shape sealing member 332 to seal the window 14. Likewise, finger 370 extends into channel 368 from leg 362 to seal the window 14. Protruding member 372 extends from the exterior surface of leg 360 to mate with channel 352 to mechanically retain the seal 332 within frame 330. Also, protruding members 374 and 376 project from the exterior surface of leg 362 to couple with channels 352 and 354 to additionally mechanically retain the seal 332 within frame 330.

Figure 7:
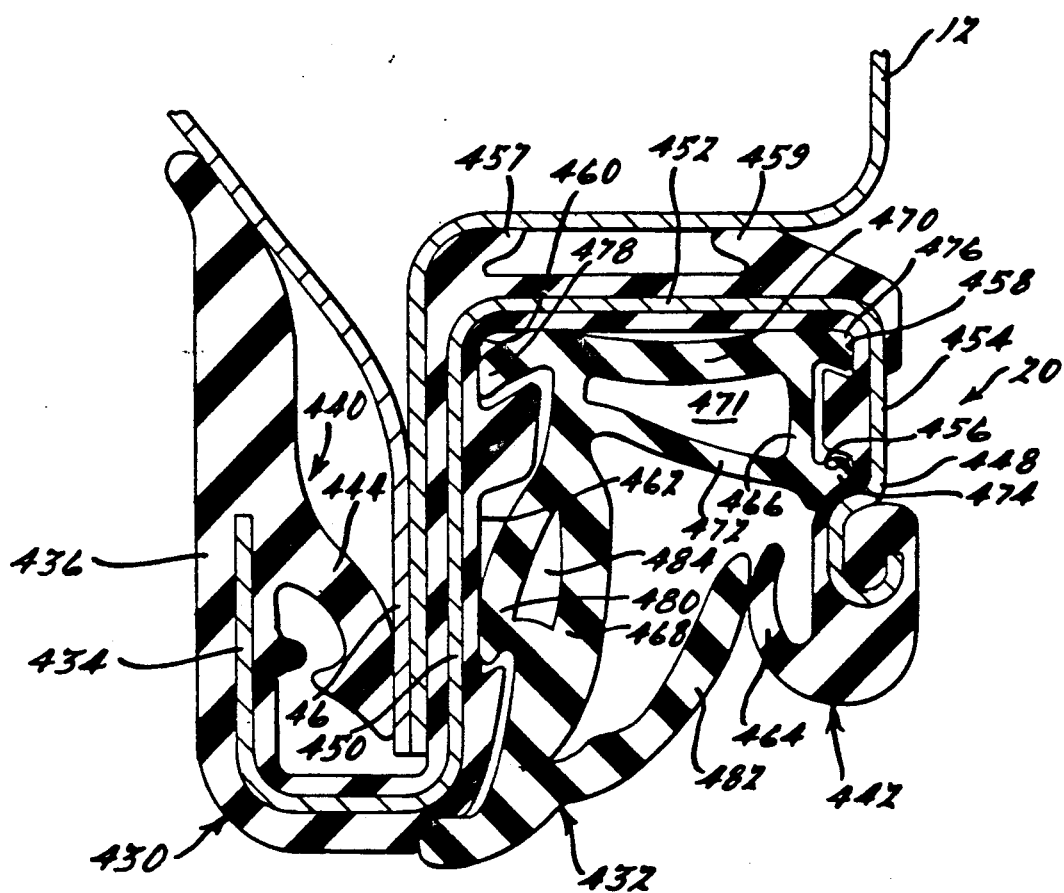
FIG. 7 illustrates a cross-section view of another embodiment of the glass run channel weather strip of the present invention.

Turning to FIG. 7, another embodiment of the present invention is illustrated. A frame 430 is illustrated with a sealing member 432 secured to a flange 46. The frame 430 includes a reinforcement member 434 and an integral skin 436. The frame member 430 has an overall S-shape formed by U-shaped portions 440 and 442 inverted with respect to one another. The U-shaped portion 440 includes a retaining finger 444 to retain the frame 430 onto the flange 46.

U-shaped portion 442 includes legs 448 and 450 joined by web 452. The leg 448 has an exposed surface 454 to provide a pleasing aesthetic appearance. Also the free end of leg 448 is curled and covered by the integral skin 436. The skin 436 also covers the interior of the U-shaped portion 442. The integral skin 436 includes a plurality of channels 456, 458, 460 and 462 on legs 448 and 450. The channels have desired shapes and are adapted to receive the seal 432 to mechanically retain the seal 432 within the frame 430. A finger 464 extends from the integral skin 436 into the U-shaped portion 442 to provide a seal with the window 14. Also, sealing members 457 and 459 extend from web 452 to seal the frame 430 against the contour of the vehicle door 12.

The seal 432 has an overall U-shape in cross-section formed by a pair of legs 466 and 468 joined by webs 470 and 472. Leg 466 extends a height away from the web 470 a distance less than that of leg 468. A hollow channel 471 is formed between the legs 466 and 468 and the webs 470 and 472. Protruding members 474 and 476 extend from the exterior surface of leg 466 to mate with the channels 456 and 458 to mechanically retain the seal 432 within the frame 430. Likewise, leg 468 includes protruding members 478 and 480 on its exterior surface which mate with channels 460 and 462 to mechanically retain the seal 432 within the frame 430. A finger 482 projects from leg 468 to seal the leg 468 with the window 14. Also, a hollow channel 484 is formed between protruding members 480 and leg 468.

While the above detailed description discloses the preferred embodiment of the present invention, it will be understood that the present invention is susceptible to modification, alteration, and change without deviating from the scope and fair meaning of the subjoined claims.

What is claimed is:

1. A glass run channel weather strip comprising:
   a first elongated member including a reinforcement element and a skin integrally bonded to said reinforcement member, said first member, in cross-section, having an overall S-shaped with a first and second U-shaped portion, said first U-shaped portion of the S-shape first member having means adapted for retaining the first member onto a flange, the second U-shaped portion having one or more retaining channels formed in the integral skin on the interior of the U-shaped portion; and
   a second elongated member having an overall U-shape in cross-section, one or more projecting members projecting from the exterior of the U-shape having shapes complementary to the shapes of the one or more channels in the second U-shaped portion of the S-shaped member adapted for coupling with said one or more channels for mechanically retaining said second member within said first member, and a finger member projecting from one of the legs of the U-shaped second member into the interior of the U-shaped second member to provide a seal when a window is positioned in the glass run channel.

2. The weather strip according to claim 1 further comprising said one or more retaining channel being on a leg of said second U-shaped portion of said S-shaped first member.

3. The weather strip according to claim 1 further comprising said one or more retaining channels being on both legs of said second U-shaped portion of said S-shaped first member.

4. The weather strip according to claim 1 wherein said integral skin surrounds the interior and exterior of said reinforcement member.

5. The weather strip according to claim 1 wherein said second member has an equal number of projecting member as number of channels.

6. The weather strip according to claim 1 wherein said skin covers the interior and exterior of the first U-shaped portion and the interior and a portion of the exterior of the second U-shaped portion of the S shaped first member.

7. The weather strip according to claim 1 wherein said second U-shaped portion of the S-shaped member has one leg with a height shorter than the other leg.

8. The weather strip according to claim 1 wherein said one or more retaining channels are on said leg.

9. The weather strip according to claim 1 wherein said second U-shaped member has one leg with a height shorter than the other leg.

10. The weather strip according to claim 1 wherein said second U-shaped member includes a pair of webs forming a hollow channel.

* * * * *

UNITED STATES PATENT AND TRADEMARK OFFICE
CERTIFICATE OF CORRECTION

PATENT NO. : 5,010,689

DATED : April 30, 1991

INVENTOR(S) : Robert A. Vaughan

It is certified that error appears in the above-identified patent and that said Letters Patent is hereby corrected as shown below:

Column 1, line 42, "is" should be --illustrates--

Column 1, line 45, after "defined" insert --by--

Column 1, line 45, "line," should be --line--

Column 1, line 47, after "of" 1st occur., insert --the--

Column 5, line 30, claim 1, "S-shaped" should be --S-shape--

Column 6, line 11, claim 2, "channel" should be --channels--

Column 6, line 23, claim 5, "member" should be --members--

Column 6, line 27, claim 6, "S shaped" should be --S-shaped--

Signed and Sealed this

Twenty-third Day of February, 1993

*Attest:*

STEPHEN G. KUNIN

*Attesting Officer*   *Acting Commissioner of Patents and Trademarks*